(12) United States Patent
Huang

(10) Patent No.: US 7,916,404 B2
(45) Date of Patent: Mar. 29, 2011

(54) FRESNEL LENS WITH CAVITIES

(75) Inventor: Yung-Lun Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/695,242

(22) Filed: Jan. 28, 2010

(65) Prior Publication Data

US 2010/0254013 A1 Oct. 7, 2010

(30) Foreign Application Priority Data

Apr. 3, 2009 (CN) .......................... 2009 1 0301341

(51) Int. Cl.
*G02B 3/08* (2006.01)
(52) U.S. Cl. ........................................... 359/742

(58) Field of Classification Search .................. 359/742, 359/743, 599
See application file for complete search history.

(56) References Cited

U.S. PATENT DOCUMENTS

2004/0165261 A1* 8/2004 Sekiguchi ..................... 359/742
* cited by examiner

*Primary Examiner* — Alicia M Harrington
(74) *Attorney, Agent, or Firm* — Raymond J. Chew

(57) ABSTRACT

An exemplary Fresnel lens includes a flat emitting surface and a plurality of annular Fresnel lens elements at an opposite side thereof to the emitting surface. Each of the Fresnel lens elements has a non-lens surface perpendicular to the emitting surface and a Fresnel lens surface adjoining the non-lens surface with an acute angle. Each of the Fresnel lens elements has a plurality of spaced cavities defined in the non-lens surface.

9 Claims, 5 Drawing Sheets

FRESNEL LENS WITH CAVITIES

BACKGROUND

1. Technical Field

The present disclosure relates to a Fresnel lens, and more particularly, a Fresnel lens having cavities in each Fresnel lens element.

2. Description of Related Art

Fresnel lenses, as a substitute for convex lenses, have being widely used for converging light beams passing therethrough. Referring to FIGS. 3 and 4, a conventional Fresnel lens 10 generally has an incident surface 11 and an emitting surface 12 opposite to the incident surface 11. The Fresnel lens 10 has a plurality of annular-shaped Fresnel lens elements 13. Each Fresnel lens element 13 includes a Fresnel lens surface 15 and an adjacent non-lens surface 14. The non-lens surface 14 is perpendicular to the incident surface 11, and the Fresnel lens surface 15 intersects the non-lens surface 14 at an acute angle.

Referring to FIG. 5, when incident light beams (denoted as A) are projected onto the Fresnel lens surface 15, a portion of the light beams (denoted as A1) travel straight on through to the emitting surface 12 and are converged at a focal panel of the Fresnel lens 10, another portion of the light beams (denoted as A2) reach the non-lens surface 14 and continue onto the emitting surface 12. Because of the paths the light beams travel, brightness of the light beams at the focal panel is weakened.

Therefore, a Fresnel lens to overcome the problems described above is needed.

BRIEF DESCRIPTION OF THE DRAWINGS

Many aspects of the Fresnel lens can be better understood with reference to the following drawings. The components in the drawings are not necessarily drawn to scale, the emphasis instead being placed upon clearly illustrating the principles of embodiments of the Fresnel lens. Moreover, in the drawings, all the views are schematic, and like reference numerals designate corresponding parts throughout the different views.

DETAILED DESCRIPTION

Figure 1:
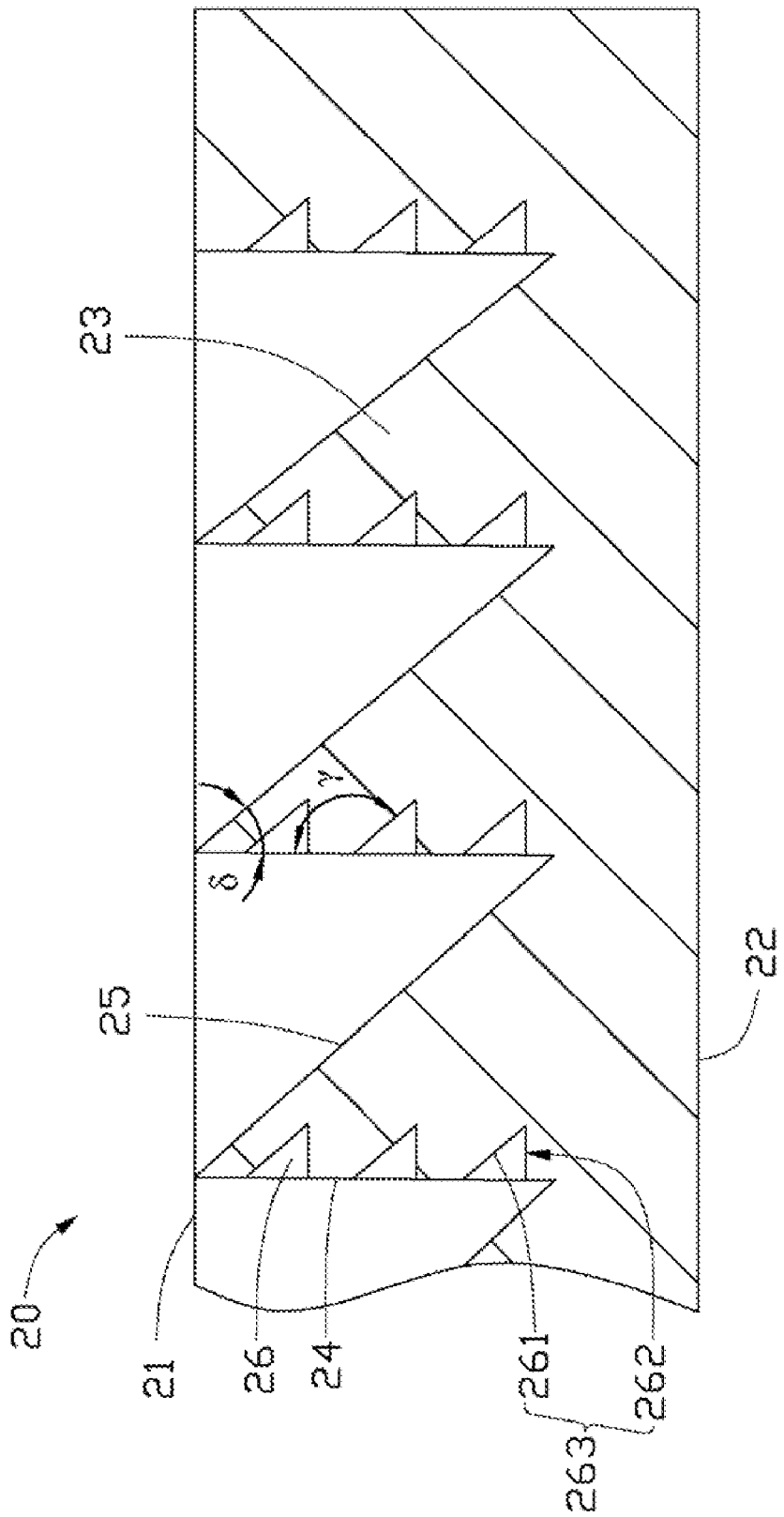
FIG. 1 is a partial, sectional view of a Fresnel lens according to an exemplary embodiment.

Referring to FIG. 1, a converging Fresnel lens 20 made of organic glass in accordance with an exemplary embodiment is shown. The Fresnel lens 20 includes an incident surface 21 and a flat emitting surface 22 opposite to the incident surface 21. The Fresnel lens 20 has a plurality of annular Fresnel lens elements 23 at the opposite side to the emitting surface 22. The Fresnel lens elements 23 are coaxially formed on a conjunct base (not labeled).

Each Fresnel lens element 23 has a non-lens surface 24 and a Fresnel lens surface 25. The non-lens surface 24 is flat and is perpendicular to the emitting surface 22, and the Fresnel lens surface 25 intersects the non-lens surface 24 at an acute angle denoted as δ. In the present embodiment, the acute angles δ of two neighboring Fresnel lens elements are equal to each other. Each non-lens surface 24 adjoins its neighboring Fresnel lens surface 25 at an acute angle so that the non-lens surfaces 24 and the Fresnel lens surfaces 25 are alternately arranged.

Each Fresnel lens element 23 has three spaced cavities 26. The three cavities 26 are defined using a super precision cutting method in the non-lens surface 24 of each Fresnel lens element 23. In the present embodiment, each of the three cavities 30 is annular and triangular cross-section. The three spaced cavities 26 are aligned with each other in a direction perpendicular to the emitting surface 22. An inner surface 263 is obtained in the each cavity 26, including a flat first surface 261 and a flat second surface 262. The first surface 261 adjoins the non-lens surface 24 with an obtuse angle labeled γ, and intersects the second surface 262 with a like angle. A critical angle of the first surface 261 totally reflects light beams transmitted in the Fresnel lens element 23 is defined as β, β and γ in the following formula: γ<2β.

Figure 2:
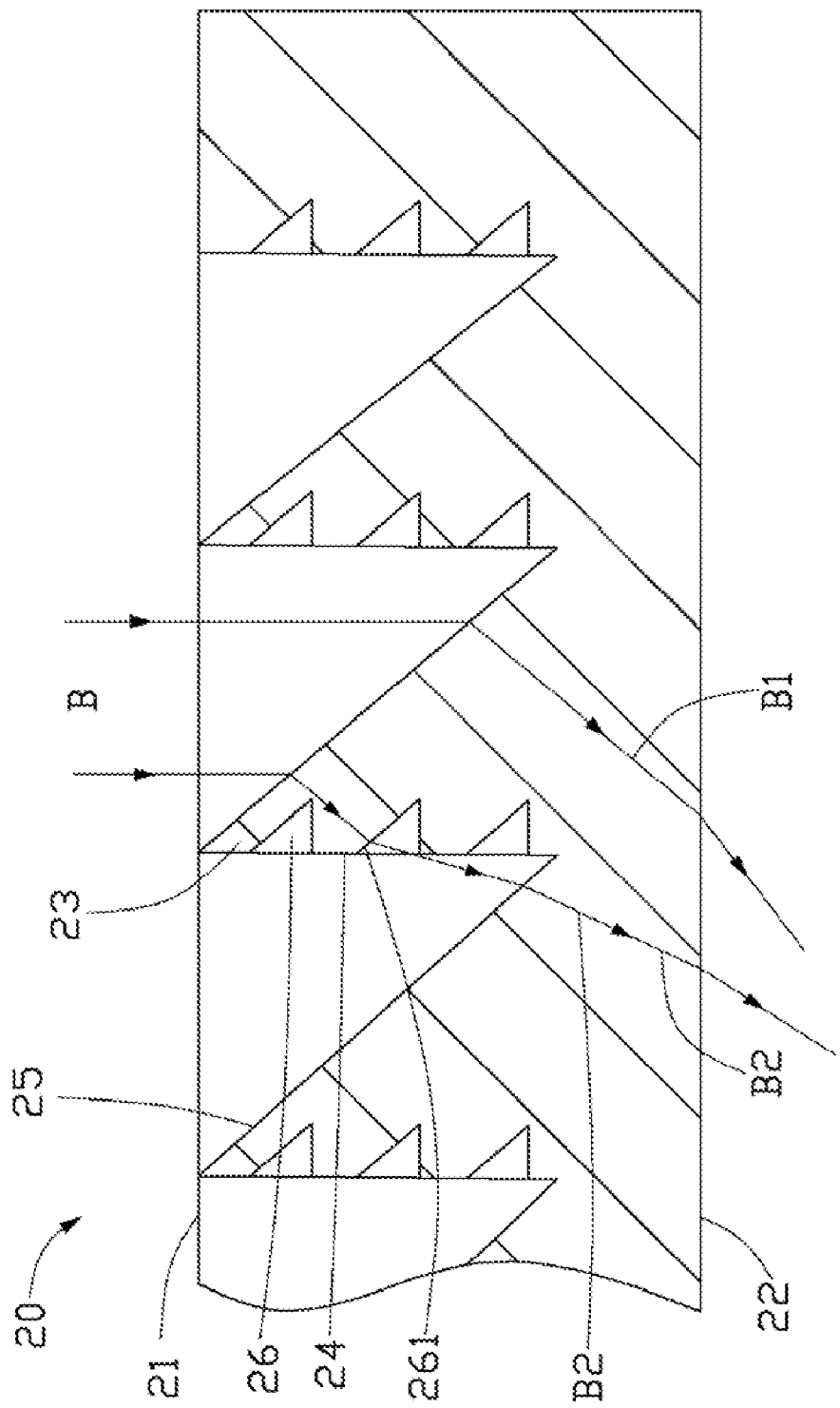
FIG. 2 shows travel path of light beams through the Fresnel lens of FIG. 1.
Figure 3:
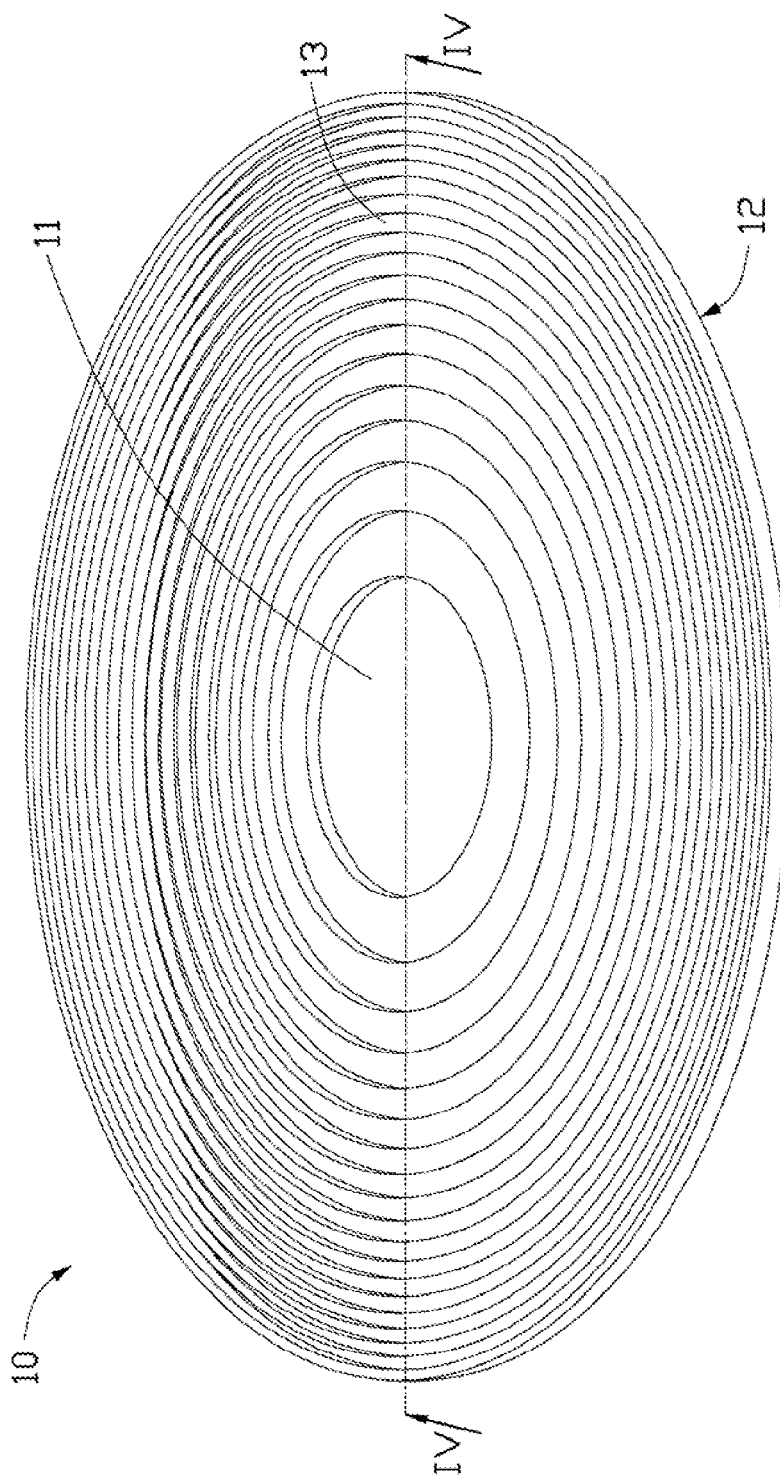
FIG. 3 is an isometric view of a conventional Fresnel lens.
Figure 4:
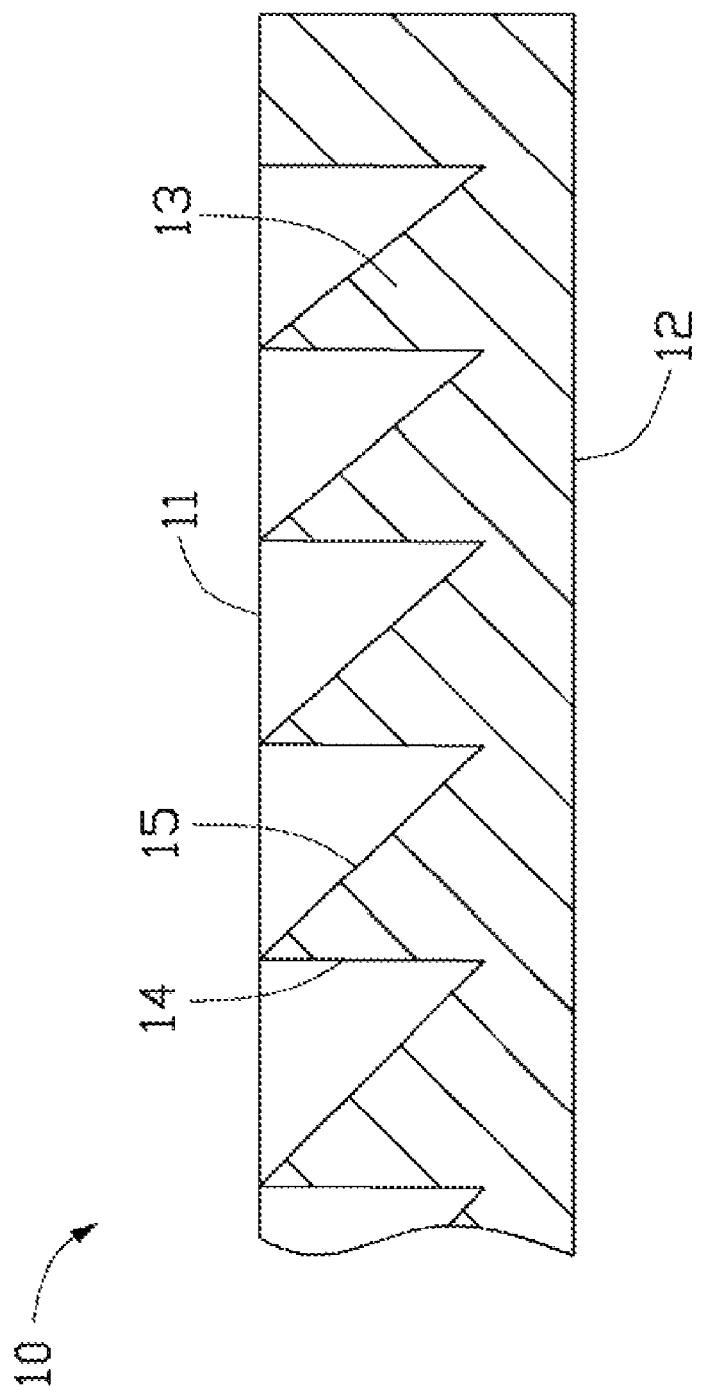
FIG. 4 is a partial, sectional view of the Fresnel lens of FIG. 3 corresponding to line IV-IV.
Figure 5:
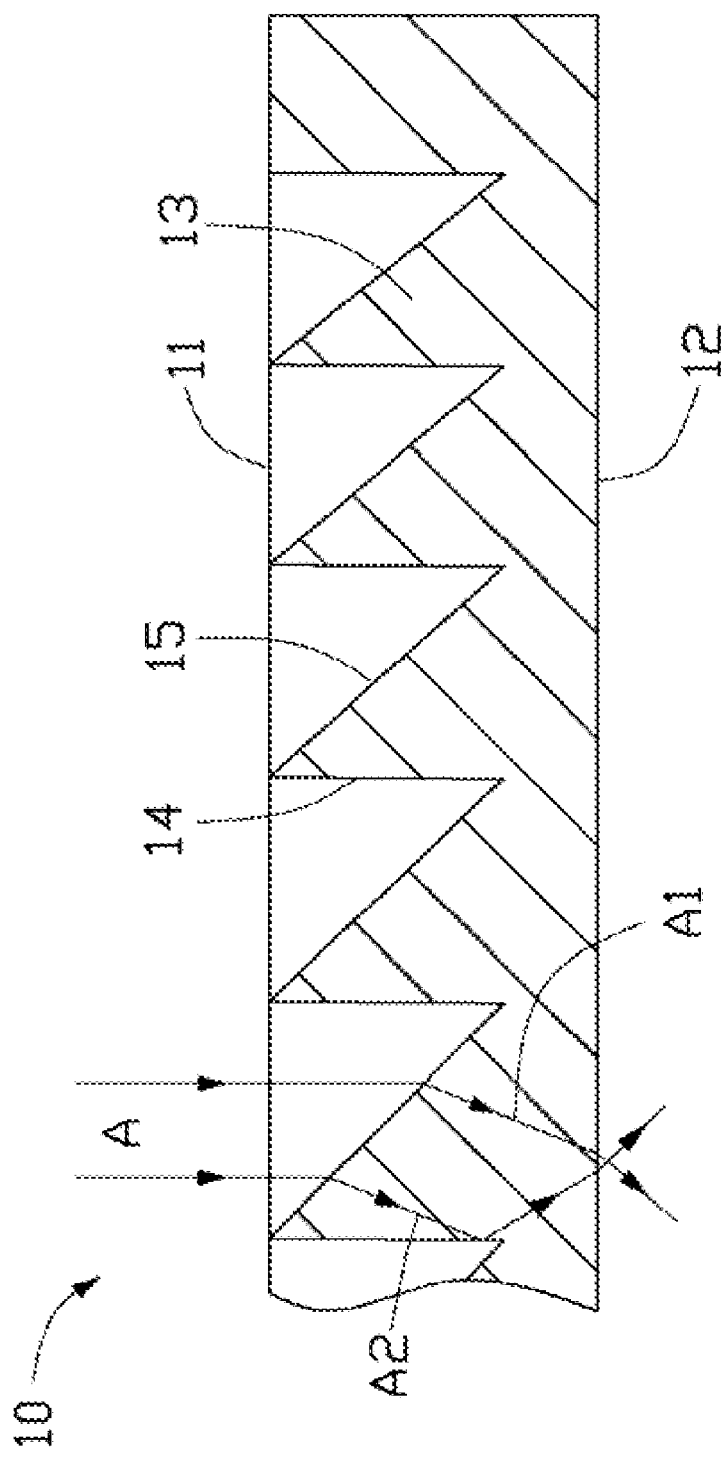
FIG. 5 shows travel path of light beams through the Fresnel lens of FIG. 3.

Referring to FIG. 2, light beams (denoted as B) from a light source (not shown) are perpendicularly projected to the incident surface 21. Some of the light beams (denoted as B1) are firstly refracted by the Fresnel lens surface 25, then refracted to the emitting surface 22, and finally emitted from the emitting surface 22 to converge on a focal panel of the Fresnel lens 20. Some of the other light beams (denoted as B2) are firstly refracted by the Fresnel lens surface 25 reaching the first surface 261.

According to Fresnel rule, $n1 \times \sin\beta = n2 \times \sin\eta$, $n1$ is the refractive index of the Fresnel lens, $\beta$ is the critical angle on the non-lens surface 24, $n2$ is the refractive index of air, and $\eta$ is equal to half of $\pi$. It is understood that if an incident angle of light beams reaching the flat first surface 261 is greater than the critical angle, the light beams are totally reflected from the flat first surface 261, otherwise, refracted into air.

In the present embodiment, the incident angle of the other light beams B2 emitted to the first surface 261 is less than the critical angle. Therefore, the other light beams B2 reaching the first surface 261 are refracted at the first surface 261 by each Fresnel lens element 23, then emitted onto an adjacent Fresnel lens surface 25 of a neighboring Fresnel lens element 23, and then refracted at the adjacent Fresnel lens surface 25 and the emitting surface 22 in the order described. Finally, the other light beams B2 are emitted from the emitting surface 22 and converged in the focal panel of the Fresnel lens 20. In such way, the travel of the light beams in the Fresnel lens 20 is changed due to existence of the cavities 30. Light beams are prevented from being totally reflected on the non-lens surface 24. The brightness of the lightbeams at the focal panel is resultantly improved.

Note that, focal length of the Fresnel lens can be adjusted by varying the first acute angles δ of each Fresnel lens element 23 according to actual use. For instance, the acute angles δ are gradually increased in a radial direction from the central portion of the Fresnel lens to a peripheral portion thereof. In another embodiments, each of the cavities 26 is semicircular in an cross-section, formed using a laser etching method.

Furthermore, the cavities 26 can be spaced diffusion dots.

While certain embodiments have been described and exemplified above, various other embodiments will be apparent from the foregoing disclosure to those skilled in the art. The present disclosure is not limited to the particular embodiments described and exemplified but can manipulated through considerable variation and modification without departure from the scope and spirit of the appended claims.

What is claimed is:

1. A Fresnel lens, comprising a flat emitting surface and a plurality of annular Fresnel lens elements at an opposite side thereof to the emitting surface, each of the Fresnel lens elements having a non-lens surface perpendicular to the emitting surface and a Fresnel lens surface adjoining the non-lens surface with an acute angle, each of the Fresnel lens elements comprising a plurality of spaced cavities defined in the non-lens surface.

2. The Fresnel lens of claim 1, wherein an inner surface in each of the cavities comprises a first flat surface and a second flat surface, the first flat surface adjoins the non-lens surface with an obtuse angle named $\gamma$, a critical angle of incident light beams totally reflected on the first surface is defined as $\beta$, $\beta$ and $\gamma$ meet following formula: $\gamma<2\beta$.

3. The Fresnel lens of claim 1, wherein the cavities are annular.

4. The Fresnel lens of claim 3, wherein each of the cavities has a triangular cross-section.

5. The Fresnel lens of claim 3, wherein each of the cavities has a semicircular cross-section.

6. The Fresnel lens of claim 1, wherein the cavities of each of the Fresnel lens elements are aligned with each other.

7. The Fresnel lens of claim 1, wherein the acute angles of two neighboring Fresnel lens elements are different from each other.

8. The Fresnel lens of claim 1, wherein the acute angles of the Fresnel lens elements are increased in a radial direction from a central portion of the Fresnel lens to a peripheral portion thereof.

9. The Fresnel lens of claim 1, wherein the cavities are diffusion dots.

* * * * *